(12) United States Patent
Van Heugten et al.

(10) Patent No.: US 12,353,112 B2
(45) Date of Patent: Jul. 8, 2025

(54) FAST ELECTROACTIVE LENS SWITCHING SYSTEMS AND METHODS

(71) Applicant: e-Vision Smart Optics, Inc., Sarasota, FL (US)

(72) Inventors: Anthony Van Heugten, Sarasota, FL (US); Yingfei Jiang, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 332 days.

(21) Appl. No.: 17/854,524

(22) Filed: Jun. 30, 2022

(65) Prior Publication Data
US 2022/0342274 A1    Oct. 27, 2022

Related U.S. Application Data

(63) Continuation of application No. PCT/US2020/067494, filed on Dec. 30, 2020.

(60) Provisional application No. 62/954,743, filed on Dec. 30, 2019.

(51) Int. Cl.
*G02F 1/29*    (2006.01)
(52) U.S. Cl.
CPC .................... *G02F 1/294* (2021.01)
(58) Field of Classification Search
None
See application file for complete search history.

(56) References Cited

U.S. PATENT DOCUMENTS

| 6,853,491 B1 | 2/2005 | Ruhle et al. |
| 10,379,419 B1 * | 8/2019 | Lu ................ G02B 27/286 |
| 2004/0100598 A1 | 5/2004 | Adachi et al. |

(Continued)

FOREIGN PATENT DOCUMENTS

| CN | 109031678 A | 12/2018 |
| CN | 110088664 A | 8/2019 |

(Continued)

OTHER PUBLICATIONS

International Search Report and Written Opinion in International Patent Application No. PCT/US2020/067494 mailed May 6, 2021, 20 pages.

(Continued)

*Primary Examiner* — Ryan Crockett
(74) *Attorney, Agent, or Firm* — Smith Baluch LLP

(57) ABSTRACT

A conventional liquid crystal lens switches on and off so slowly that a person can perceive the lens's gradual transition from high to low optical power. This makes a conventional liquid crystal lens unsuitable for focusing virtual images quickly in an augmented, mixed, or virtual reality system. Conversely, an inventive fast-switching electroactive lens system can switch so fast (e.g., in 35 milliseconds or less) that a person perceives its optical power to change instantaneously. The system accomplishes this fast switching with using an electroactive wave plate in series with slower liquid-crystal lenses. The wave place can be switched quickly between emitting vertically or horizontally polarized light. Each lens focuses either vertically or horizontally polarized light and transmits orthogonally polarized light. By switching between polarization states, the wave plate effectively turns one lens on and the other lens off much faster than either lens could be switched by itself.

19 Claims, 8 Drawing Sheets

(56) References Cited

U.S. PATENT DOCUMENTS

| | | | |
|---|---|---|---|
| 2015/0331247 A1 | 11/2015 | Srivastava et al. | |
| 2017/0184848 A1* | 6/2017 | Vallius | G02B 27/4261 |
| 2018/0129048 A1 | 5/2018 | Robbins et al. | |
| 2018/0239177 A1* | 8/2018 | Oh | G02B 26/0825 |
| 2019/0227375 A1* | 7/2019 | Oh | G02B 27/0172 |
| 2020/0018962 A1* | 1/2020 | Lu | G02B 27/0172 |
| 2022/0291526 A1* | 9/2022 | Van Heugten | G02F 1/139 |
| 2022/0317457 A1* | 10/2022 | Van Heugten | G02B 27/0961 |

FOREIGN PATENT DOCUMENTS

| | | |
|---|---|---|
| JP | S54151854 A | 11/1979 |
| JP | S63135916 A | 6/1988 |
| KR | 20180053936 A | 5/2018 |
| WO | 2018212479 A1 | 11/2018 |
| WO | 2019173390 A1 | 9/2019 |

OTHER PUBLICATIONS

Canadian Examiner Report in Canadian App. No. 3,163,465 dated Sep. 27, 2023, 3 pages.

Examiner Report (Second) in Canadian App. No. 3,163,465 dated Jun. 6, 2024, 3 pages.

Office Action with translation in Japanese App. No. 2022-540632 dated Jun. 3, 2024, 11 pages.

Sato, "Liquid-crystal lens-cells with variable focal length." Japanese Journal of Applied Physics 18.9, Sep. 1979, vol. 18, No. 9, p. 1679-1684, DOI:10.1143/JJAP.18.1679, Abstract, 3 pages.

Extended European Search Report in European App. No. 20908555.4 dated Jan. 3, 2024, 5 pages.

First Office Action with translation in Chinese App.202080096643. 4, dated Nov. 7, 2024, 29 pages.

Chinese Office Action (NOA) with translation in Chinese App. 202080096643.4, dated Apr. 28, 2025, 9 pages.

* cited by examiner

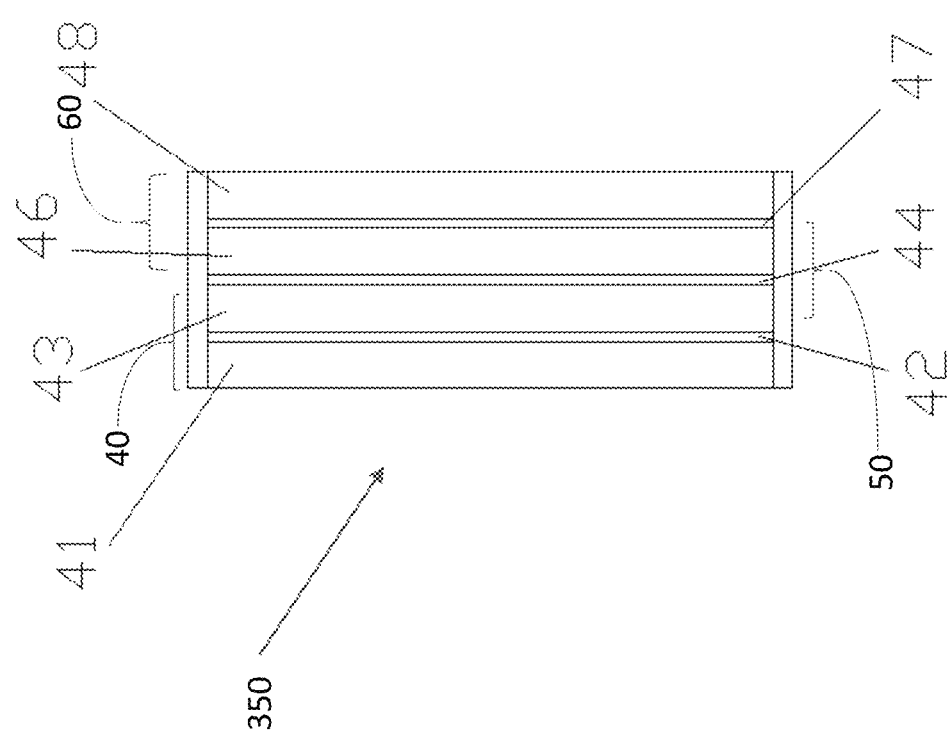

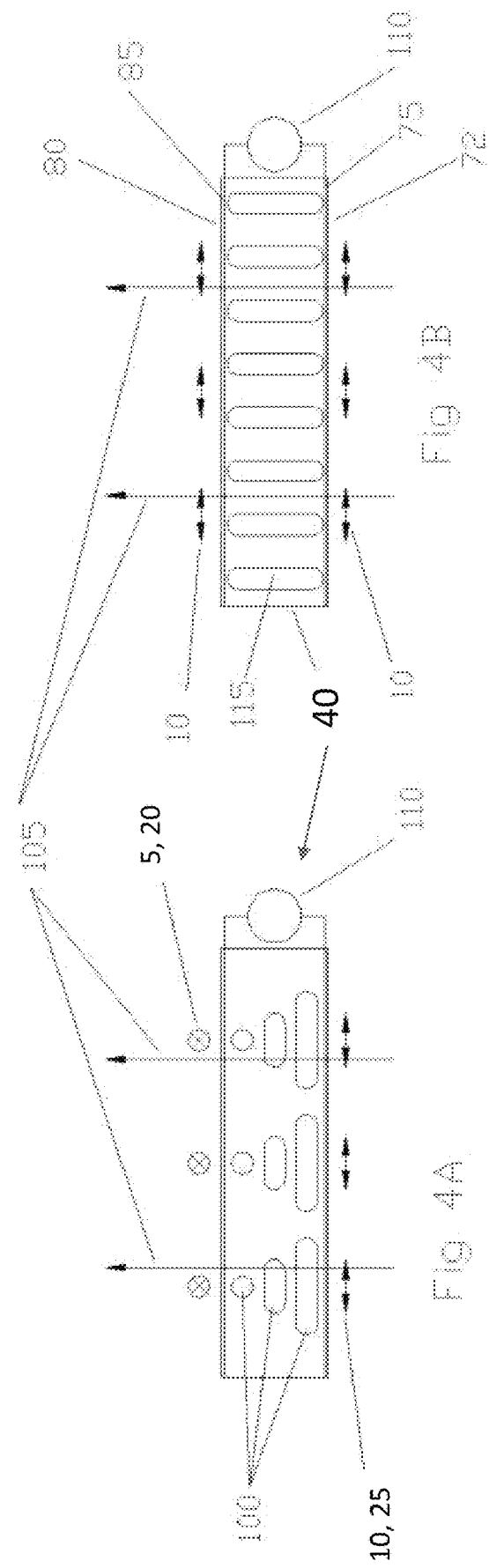

FAST ELECTROACTIVE LENS SWITCHING SYSTEMS AND METHODS

CROSS-REFERENCE TO RELATED APPLICATIONS

This application is a bypass continuation of International Application No. PCT/US2020/067494, filed on Dec. 30, 2020, which claims the priority benefit, under 35 U.S.C. § 119(e), of U.S. Application No. 62/954,743, filed on Dec. 30, 2019. Each of these applications is incorporated herein by reference in its entirety for all purposes.

BACKGROUND

An electroactive lens can be used to adjust the focus of a person's eye onto a digital image presented in an augmented or virtual reality display at a fixed virtual location from the eye but at various simulated distances. A typical electroactive lens is low in mass and volume and consumes little energy but does not switch optical power quickly. A typical thirty to forty millimeter wide electroactive lens takes a few hundred milliseconds to switch from one optical power to another optical power. This delay is discernable by the user and degrades the quality of the visual experience.

SUMMARY

An inventive electroactive lens system can (appear to) switch from one optical power to another in tens of milliseconds, or faster, rather than hundreds of milliseconds. It does this with a pair of electroactive lens elements (also called electroactive lenses), configured to operate on light in orthogonal polarization states (e.g., horizontal and vertical polarization states), and a dynamic polarization switcher that can switch light between those orthogonal polarization states in tens of milliseconds. For example, the first electroactive lens element may be configured to focus horizontally polarized light but not vertically polarized light, and the second electroactive lens element may be configured to focus vertically polarized light but not horizontally polarized light. Even if the electroactive lens elements turn on and off slowly, e.g., in hundreds of milliseconds, the polarization adjuster can switch the light between horizonal and vertical polarization states in tens of milliseconds. If the first and second electroactive lens elements have different optical powers, the polarization adjuster can effectively change the lens's optical power within tens of milliseconds by switching the light between horizonal and vertical polarization states quickly.

Although the optical power should be switched in tens of milliseconds or less, the time between switching events is rarely that brief. In practice, the time between switching events can be several seconds or more. The difference in the time it takes to switch an electroactive lens and the time between switching events can be exploited to increase the switching speed in a device with a fast polarization adjuster (also called a polarization orientation changer or variable retarder) and one or more slower focus-changing devices (electroactive or liquid-crystal lens elements). By combining a fast polarization-changing component with one or more slower focus-changing components (e.g., first and second electroactive lens elements), the polarization-changing component allows the optical power of only one focus-changing component to be "optically present" in the optical system at a time. While one focus-changing device is optically present, the other focus-changing components are not optically present, and vice versa. Since the polarization-changing component can switch incident light rapidly from one polarization orientation to the other, the system can rapidly switch from one focus-changing component to the other, with no moving parts. In a fast-changing electroactive lens system with only a single focus-changing element, the system can be rapidly switched from a "lens on" state to a "lens off" state rapidly. There is no limit to the number of focus-changing elements that can be used in a single electroactive lens system.

An inventive electroactive lens system may include a polarization changer, a first electroactive lens in optical communication with the polarization changer, and a second electroactive lens in optical communication with the polarization switcher and the first electroactive lens. The polarization changer is switchable between a first state in which the polarization changer switches a polarization of light between a first and second polarization states (e.g., orthogonal linear polarization states) and a second state in which the polarization changer transmits light in the first polarization state. The first electroactive lens is switchable between a first focusing state in which the first electroactive lens focuses light in the first polarization state and transmits light in the second polarization state and a first transmitting state in which the first electroactive lens transmits light in the first and second polarization states. And the second electroactive lens is switchable between a second focusing state in which the second electroactive lens transmits light in the first polarization state and focuses light in the second polarization state and a second transmitting state in which the second electroactive lens transmits light in the first and second polarization states.

The polarization switcher may comprise a liquid-crystal wave plate and may have a retardance of $\pi/2$ in the first state and a retardance of 0 in the second state. The polarization switcher can be configured to switch between the first state and the second state (i) faster than the first electroactive lens is configured to switch between the first focusing state and the first non-focusing state and (ii) faster than the second electroactive lens is configured to switch between the second focusing state and the second non-focusing state. For instance, the polarization switcher may switch between the first and second states within 100 milliseconds, 50 milliseconds, 35 milliseconds, 30 milliseconds, 25 milliseconds, 20 milliseconds, 15 milliseconds, 10 milliseconds, 5 milliseconds, or faster. Similarly, the first and second electroactive lenses may each be configured to switch between their respective focusing and non-focusing states in more than 100 milliseconds.

The polarization switcher and electroactive lenses may be integrated together, e.g., with no air gaps between components. For instance, the polarization switcher and first electroactive lens can share a first common substrate. Likewise, the first and second electroactive lenses can share a second common substrate.

This electroactive lens system can be used or operated by setting the polarization switcher to the first or second state; setting the first electroactive lens to the first focusing state or the first non-focusing state; setting the second electroactive lens to the second focusing state or the second non-focusing state; and sending the light through the polarization switcher, the first electroactive lens, and the second electroactive lens. If the polarization switcher is in the first state, the first electroactive lens is in the first focusing state, and the second electroactive lens is in the second non-focusing state, the second electroactive lens can be switched from the second non-focusing state to the second focusing state while the system transmits light in the first polarization state through the polarization switcher, focuses the light with the first electroactive lens, and transmits the light through the second electroactive lens without focusing the light by the second electroactive lens. After the second electroactive lens is switched from the second non-focusing state to the second focusing state, the polarization switcher can be switched from the first state to the second state, thereby causing the second electroactive lens to focus the light and causing the first electroactive lens to transmit the light without focusing the light. Switching the second electroactive lens from the second non-focusing state to the second focusing state and switching the polarization switcher from the first state to the second state may occur in response to a desired change in a position of a virtual image. Switching the second electroactive lens from the second non-focusing state to the second focusing state may take at least 100 milliseconds and switching the polarization switcher from the first state to the second state may take less than 100 milliseconds.

Another electroactive lens system includes a liquid-crystal wave plate in optical series with first and second liquid-crystal lenses. The liquid-crystal wave plate is switchable between a 0-wave retardance and a half-wave retardance within 35 milliseconds. The first liquid-crystal lens is switchable between a first state in which it focuses light in a first linear polarization state to a first focal plane and a second state in which it focuses light in the first linear polarization state to a second focal plane. The second liquid-crystal lens is switchable between a first state in which it focuses light in a second linear polarization state orthogonal to the first linear polarization state to a third focal plane and a second state in which it focuses light in the second linear polarization state to a fourth focal plane.

The liquid-crystal wave plate and the first liquid-crystal lens can share a first common substrate, and the first liquid-crystal lens and the second liquid-crystal lens can share a second common substrate. The first and second liquid-crystal lenses can transmit light in the second and first linear polarization states, respectively. The first liquid-crystal lens may take more than 35 milliseconds (e.g., 100 milliseconds or more) to switch between the first and second states.

This electroactive lens system may also include a display in optical communication with the liquid-crystal wave plate and configured to emit light in the first linear polarization state. And it may include a processor operably coupled to the liquid-crystal wave plate, the first liquid-crystal lens, the second liquid-crystal lens, and the display and configured to control a retardance of the liquid-crystal wave plate, the first liquid-crystal lens, the second liquid-crystal lens, and the display.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3B shows an integrated fast-switching electroactive lens system.

FIG. 4A shows a cross-sectional profile view of a fast polarization orientation adjuster (variable retarder) in an off state.

FIG. 4B shows a cross-sectional profile view of the fast polarization orientation adjuster (variable retarder) of FIG. 4A in an on state.

DETAILED DESCRIPTION

A fast-switching electro-active lens system can change the focus of linearly polarized light from an object, for example, a display in an augmented reality headset, in periods of less than 35 milliseconds (e.g., 30, 25, 20, 15, 10, 5, or fewer milliseconds). It does this with a combination of fast-switching wave plates and slow-switching liquid crystal lenses. Each lens has two eigenaxes orthogonal to each other and to the lens's optical axis. Each lens focuses light polarized along one eigenaxis (the focusing eigenaxis) and transmitting light polarized along the other eigenaxis (the transmitting eigenaxis). The amount of focus, i.e., the optical power, along a lens's focusing eigenaxis depends on the liquid crystal thickness and applied voltage, among other things, and can be tuned continuously (e.g., between a −5 and +5 diopters) or switched among two or more discrete states (e.g., in 0.5 or 1.0 diopter increments between 0 and 5 diopters). Each lens can provide no (zero) optical power when it is off (when no voltage is applied) or can provide a non-zero optical power when it is off. Other ranges and values of optical power are also possible.

The lenses are aligned so that their optical axes are coincident but their eigenaxes are rotated by 90° with respect to each other—the first lens's focusing eigenaxis is parallel with the second lens's transmitting eigenaxis, and the first lens's transmitting eigenaxis is parallel with the second lens's focusing eigenaxis. The lenses optical axes are aligned coincident with the wave plate's optical axis, and the wave plate's eigenaxes are aligned with the lenses' eigenaxes. In other words, the wave plate and lenses have coincident surface normals and aligned eigenaxes when viewed along their surface normals (the fast-switching electroactive lens system's optical axis).

Because the lenses are aligned with 90°-rotated focusing and transmitting eigenaxes, when the system is illuminated by light that is linearly polarized along one of the system's eigenaxis, one lens focuses the light and other lens transmits the light. Transforming the polarization state of the incident light to the orthogonal linear polarization state (e.g., from horizontal to vertical or from +45° to −45° switches the lenses' operation. The wave plate changes state much faster than the lenses, allowing much quicker user-observable transitions from one optical power to the other than if a single lens were to provide all the optical adjustments. And if the transitions occur infrequently (e.g., at intervals greater than the lens switching time), then one lens can be switched between optical power levels while the other lens focuses light so that it is ready for the next transition.

Polarization States and Liquid Crystal Alignment Directions

Figure 1A:
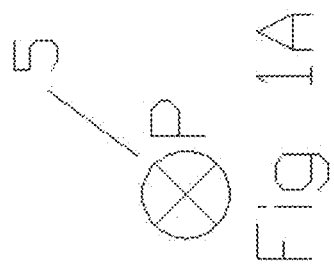
FIGS. 1A-1C illustrate notations for linearly polarized light.
Figure 1B:
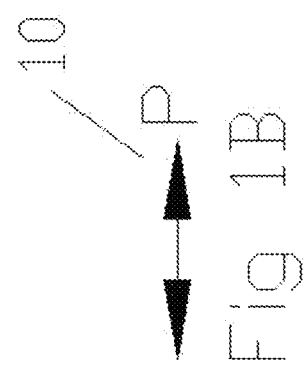
Figure 1C:
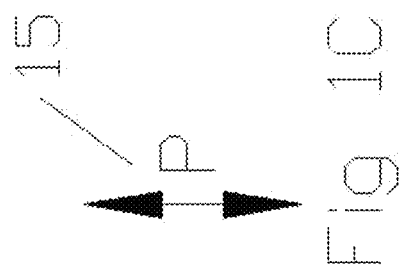

FIGS. 1A, 1B, and 1C show symbols used in this disclosure to describe different linear polarization orientations or states. Symbol 5 in FIG. 1A indicates that the direction of the linear polarization as if it were "going into and out of the flat plane of the figure." Symbol 10 in FIG. 1B indicates that the direction of the linear polarization is orthogonal to the direction indicated by symbol 5. In this case, the direction of the linear polarization is "left and right across the flat plane of the figure." Symbol 15 in FIG. 1C indicates that the direction of the linear polarization is also orthogonal to the direction indicated by symbol 5. The direction of the linear polarization indicate by symbol 15 is "up and down across the flat plane of the figure."

Figure 2A:
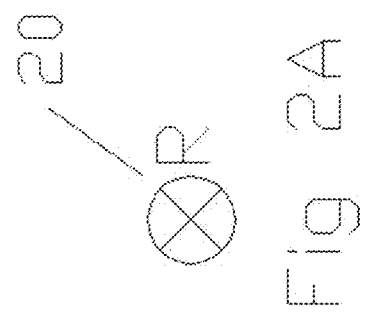
FIGS. 2A-2C illustrate notations for liquid crystal alignment (rub) directions.
Figure 2B:
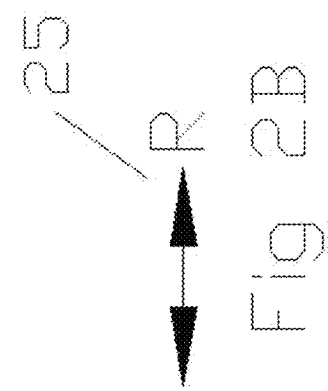
Figure 2C:
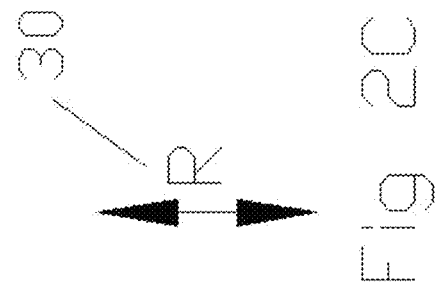

FIGS. 2A, 2B and 2C show the symbols used in this disclosure to describe the orientation of the rub or alignment directions of the alignment layers used in the liquid-crystal focus changers (electroactive lenses). Symbol 20 in FIG. 2A indicates the rub direction as if it were "going into and out of the flat plane of the figure." Symbol 25 in FIG. 2B indicates that the rub direction is orthogonal to the direction indicated by symbol 20, and in this case the rub direction is "left and right across the flat plane of the figure." Symbol 30 in FIG. 2C indicates that the rub direction is orthogonal to the directions indicated by symbols 20 and 25, with the rub direction "up and down across the flat plane of the figure." Each liquid-crystal lens typically has two alignment layers-one on either side of the liquid crystal material-whose rub directions may be parallel, anti-parallel, or orthogonal to each other. In some cases, only one alignment layer may be used for cost reduction. Using two alignment layers increases both the switching speed and the width of the field of view.

The symbols shown in FIGS. 1A-1C and 2A-2C indicate relative directions. Different symbols can be used to indicate the same polarization state in different drawings if those drawings are from different perspectives. Similarly, the same symbol can be used to indicate the different polarization state in different drawings if those drawings are from different perspectives. For example, in a side or profile view of an optical component, symbol 5 may indicate a horizontal polarization state and symbol 10 may indicate a vertical polarization state. In an end-on view (i.e., a view along the optical axis) of the same optical component, symbol 10 may indicate the horizontal polarization state and symbol 15 may indicate the vertical polarization state.

Fast Electroactive Lens Switching Systems

Figure 3A:
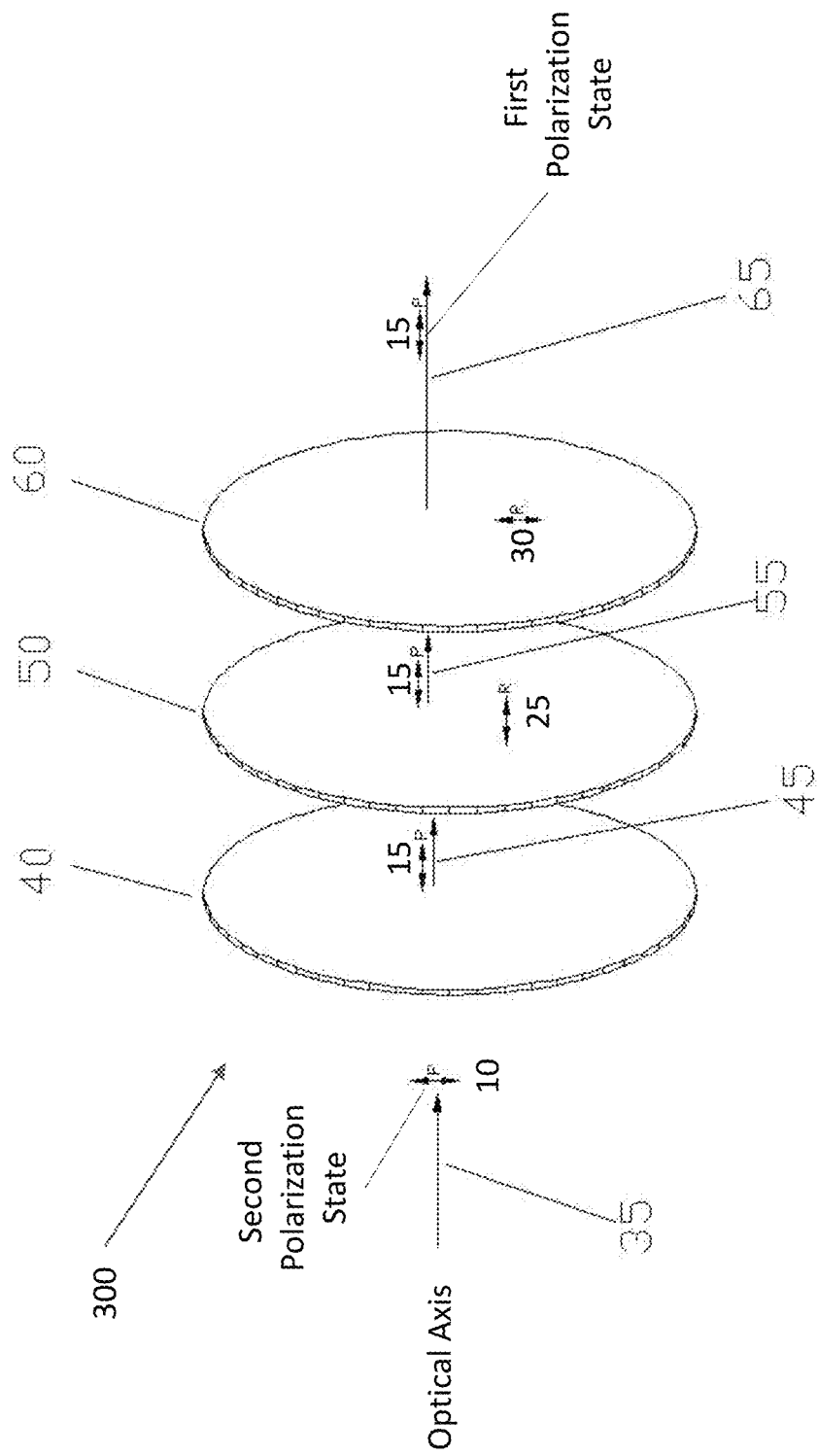
FIG. 3A shows an exploded view of an example fast-switching electroactive lens system with a fast polarization changer followed by a pair of slower electroactive lenses.

FIG. 3A shows an exploded view of a fast switching lens system 300 that includes a polarization orientation changer (also called a polarization rotator, polarization adjuster, or variable retarder) 40 in optical communication with a first electroactive lens 50 and a second electroactive lens 60. The polarization orientation changer 40, first electroactive lens 50, and second electroactive lens 60 are in optical series with each other or stacked together. The lens system 300 may utilize planar liquid crystal in all three components 40, 50, and 60, for example, Merck MLC-2140. The first electroactive lens 50 has its alignment layer oriented orthogonal to the alignment layer of the second electroactive lens 60. In this case, the first electroactive lens 50 has a horizontally oriented liquid-crystal rub direction 25 and the second electroactive lens 60 has a vertically oriented liquid-crystal rub direction 30. Other rub directions are also possible (for example, ±45° rub directions), typically used if less-than-100% focusing is required (in other words, focus only a portion of the light while allowing the other portion to pass through unfocused).

Although the device 300 shown in FIG. 3A is a preferred embodiment, additional polarization switchers may be added to add functional control options. For example, the device 300 in FIG. 3A can switch quickly between the optical powers of lens 50 and lens 60. If an additional polarization switcher is positioned between lens 50 and lens 60, actuating both polarization switchers makes it possible to change the polarization state of the light propagating through the system so that both lenses 50, 60 focus the light. More specifically, the first polarization switcher 40 can switch the light from the second polarization state 10 to the first polarization state 15, and the second polarization switcher (not shown) can switch the light from the first polarization state 15 to the second polarization state 10. Alternatively, both polarization switchers can be actuated so that neither lens 50, 60 focuses the light even though one or both lenses are actuated to provide optical power or are being switched between states. This can be useful for providing more optical power than can be provided by a single lens.

In operation, linearly polarized light 35 from an object (e.g., a display or spatial light modulator in an augmented or virtual reality system) enters the polarization rotator 40 in a second polarization state (e.g., vertically polarized as shown by symbol 10). If the polarization rotator 40 is in a first state (e.g., off), as shown in FIG. 3A, then it emits light 45 in a first polarization state, which may be rotated by 90° with respect to the second polarization state (e.g., horizontally polarized as shown by symbol 15). If the polarization rotator 40 is in a second state (e.g., on), then it emits light 45 whose polarization state is the same as the polarization state as the input light 35 (horizontally polarized in this example).

The light 45 exiting the polarization adjuster 40 enters the first electroactive lens 50, which focuses the light 45 to a first focal plane if the light 45 is in the first polarization state (e.g., vertically polarized) and the first electroactive lens 50 is in a first state (e.g., on). If the light 45 is in the first polarization state and the first electroactive lens 50 is in a second state (e.g., off), the first electroactive lens 50 focuses the light to a second focal plane. And if the light 45 is in the second polarization state (e.g., horizontally polarized), it passes through the first electroactive lens 50 without being focused by the first electroactive lens 50.

Light 55 exiting the first electroactive lens 50 enters the second electroactive lens 60, which, like the first electroactive lens 50, is switchable between two states (e.g., on and off states). Unlike the first electroactive lens 50, however, the second electroactive lens 60 acts only on light in the second polarization state (e.g., horizontally polarized). When the second electroactive lens 60 is in the first state, it focuses light in the second polarization state to a third focal plane. And when the second electroactive lens 60 is in the second polarization state, it focuses light in the second polarization state to a fourth focal plane. Light 55 in the first polarization state (e.g., vertically polarized) passes through the second electroactive lens 60 without being focused by the second electroactive lens 60. Light 65 exits the second electroactive lens 60 and the system 300.

If the first electroactive lens 50 and second electroactive lens 60 provide different optical power levels, the lens system 300 can be switched among a series of different optical power levels focal lengths by actuating the polarization switcher 40, first electroactive lens 50, and second electroactive lens 60. For example, if the first electroactive lens 50 can be switched between optical power levels of 0.0 Diopters and 1.0 Diopters (first/on and second/off states, respectively) and the second electroactive lens 50 can be switched between optical power levels of 0.5 Diopters and 1.5 Diopters (first/on and second/off states, respectively), the lens system 300 can switched among optical power levels of 0.0, 0.5, 1.0, and 1.5 Diopters by actuating the polarization switcher 40, first electroactive lens 50, and second electroactive lens 60. These optical power levels are just examples; other optical power levels are also possible, including optical power levels that are not evenly spaced, such as optical power levels selected to bring objects into focus at near, near-intermediate, intermediate, far-intermediate, and/or far planes.

The fast switching speed of the polarization adjuster 40 makes it possible for the lens system 300 to switch among these optical power levels quickly (e.g., within 30 ms or less) even though the first and second electroactive lenses 50 and 60 may switch slowly (e.g., in 100 ms or more). For instance, while the first electroactive lens 50 is on and the polarization adjuster 40 is off, the second electroactive lens 60 may be transitioned from one optical power to the other without affecting the light propagating through the lens system 300. Once the second lens 60 has completed its transition, is ready, and is at the desired optical power, the polarization adjuster 40 switches states, causing the second electroactive lens 60 to focus the light while the first electroactive lens 50 no longer focuses the light even if the first electroactive lens 50 is still on.

FIG. 3A shows the components in an exploded, perspective view, with gaps between the components. Although the lens system would work with gaps as shown in FIG. 3A, the lens system can also be made with the components next to each other and bonded or integrated together to eliminate reflections at the interfaces. For example, the first electroactive lens 50 can share a first substrate with the polarization orientation changer 40 and share a second substrate with the second electroactive lens 60.

FIG. 3B shows an integrated fast-switching electroactive lens system 350. In this system 350, substrates 41 and 43, together with liquid crystal layer 42, form the polarization adjuster 40. Substrates 43 and 46, together with liquid crystal layer 44, form the first lens 50. And substrates 46 and 48, together with liquid crystal layer 47, form the second lens 60. Substrates 43 and 46 are shared by multiple components and so are coated on each side with separate alignment layers and independently actuated electrodes (not shown).

Fast Polarization Adjuster (Variable Retarder)

FIGS. 4A and 4B show side views of a cross section of the polarization adjuster 40. FIG. 4A shows the adjuster 40 in an unpowered or off (first) state, while FIG. 4B shows the adjuster 40 in a powered or on (second) state.

The polarization adjuster 40 is comprised of a first substrate 72 and a second substrate 80, with planar liquid crystal (for example, Merck MLC-2140 nematic liquid crystal) sandwiched and sealed between the two substrates 72 and 80. On the surface of lower substrate 72 is a transparent, electrically conductive coating 75, also called an electrode (for example, indium tin oxide (ITO)). Atop this electrode 75 is a transparent alignment layer (for example, polyimide made from Nissan Sunever 410 polyimide varnish). The alignment layer is typically applied, cured, and then rubbed with a felt cloth along in the direction of the desired alignment orientation. (FIGS. 2A-2C illustrate possible rubbing directions for the alignment layer.) Adjacent to electrode 75 is the liquid crystal. On the surface of upper substrate 80 is another electrically conductive coating (electrode) 85, which can be made of the same material(s) that the first electrode 75 is made from.

FIG. 4A shows a difference between the electrodes 75 and 85: when the polarization adjuster 40 is off, the alignment layer on the first electrode 75 is configured to orient the adjacent liquid crystal molecules in the direction indicated by symbol 25, whereas the alignment layer on the second electrode 85 is configured to orient the adjacent liquid crystal molecules in the direction indicated by symbol 20. As a result of this configuration, the liquid crystal molecules are aligned at the first electrode 75 in orientation/direction 25, aligned at the second electrode 85 in orientation/direction 20, aligned in the middle of the liquid crystal layer in an orientation/direction midway between orientation 25 and orientation 20, and gradually twisted closer to orientations 25 and 20 the closer the liquid crystal is to the first electrode 75 and second electrode 85, respectively. This twisted configuration is indicated by the three symbols 100 in FIG. 4A. This twisting of liquid crystal molecules adjusts or changes the polarization direction of light 105 from polarization orientation 10 as it enters the polarization adjuster 40 to polarization orientation 5 as it exits the polarization adjuster 40.

FIG. 4B shows the polarization adjuster 40 with a voltage supply 110 applying an electric field potential to the first electrode 75 while the opposite electric field potential is applied to the second electrode 85. The applied voltage may be an alternating current (AC) signal, such as a sine or square wave. When power is applied, the liquid crystal molecules reorient from orientation 100 to orientation 115 as shown in FIG. 4B. In this state, the polarization orientation 10 of the light 105 entering the polarization adjuster is the same as the polarization orientation 10 of the light 105 as it exits the polarization adjuster. In other words, applying the voltage to the electrodes 75 and 85 changes the polarization adjuster's retardance from $\pi/2$ to 0. The polarization adjuster 40 does not change the light's direction of propagation.

Other configurations of the polarization adjuster are also possible. For instance, the alignment layers can have parallel or anti-parallel rub directions instead of crossed or orthogonal rub directions as in FIGS. 4A and 4B. With parallel or anti-parallel rub directions, the polarization adjuster does not change the polarization state of incident light when it is off (i.e., when no voltage is applied across the liquid crystal by the electrodes); its nominal retardance is 0. Instead, the polarization adjuster changes the polarization state of incident light when it is on (i.e., when a voltage is applied across the liquid crystal by the electrodes), for example, by changing horizontally polarized light or vertically polarized light for a retardance change of π/2.

The polarization adjuster's design parameters, including the liquid crystal material and liquid crystal thickness, may be selected to increase the switching speed. The formulas below give an example design set to achieve fast switching speed and high optical efficiency. Several example turn-off times are shown (indicating that a preferred liquid crystal thickness of either 2.4 μm or 5.3 μm), however, the turn-on times may be reduced by using higher-than-needed switching voltages. The liquid crystal used in the preferred embodiment is HAE614752 made by Jiangsu Hecheng Display Technology Co. Ltd. of China. Other liquid crystals may be used as well, for example, MLC2136 made by Merck Chemicals of Germany.

For a twisted nematic liquid crystal cell placed between two polarizers aligned parallel and perpendicular to the respective surface molecular directors, the transmission is:

$$T=(1+u^2)^{-1}\sin^2[\theta\sqrt{(1+u^2)}],$$

where $u=\pi d\Delta n/\theta\lambda$, $\theta$ is the liquid crystal twist angle, d is the cell thickness, $\Delta n$ is the refractive index anisotropy of the liquid crystal material, and $\lambda$ is the transmission wavelength. For a twisted nematic liquid crystal cell between parallel polarizers (i.e., $\theta=\pi/2$), the transmission becomes:

$$T=(1+2x^2)^{-1}\sin^2\left[\frac{\pi}{2}\sqrt{(1+4x^2)}\right],$$

where $x=d\Delta n/\lambda$. The transmission minima for this expression occur for $x=\sqrt{m^2-1/4}$, where m is a positive integer. The first minimum occurs for x=0.87, which corresponds to $\Delta n=0.2$, $\lambda=550$ nm and d=2.4 μm.

| Transmission Minimum No. (m) | Thickness (d; μm) | Estimated Turn-Off Time (ms) |
|---|---|---|
| 1 | 2.4 | 6 |
| 2 | 5.3 | 29 |
| 3 | 8.1 | 66 |
| 4 | 10.9 | 120 |
| 5 | 13.7 | 190 |

A polarization switcher that provides a half wave of retardance (i.e., $\theta=\pi/2$), should have a liquid crystal layer whose thickness meets the criteria for minimum transmission using the equation given above. For a liquid crystal layer with $\Delta n=0.2$, $\lambda=550$ nm, a viscosity of 100 mPa, and K=10 pN, the liquid crystal layer thickness should 2.4 μm or 5.3 μm for a switching time of 6 ms or 29 ms, respectively. These switching times are short enough for the polarization switcher to change state (e.g., turn on or off) without a lag perceptible by a person.

Operation of a Fast-Switching Electroactive Lens System

Figure 5:
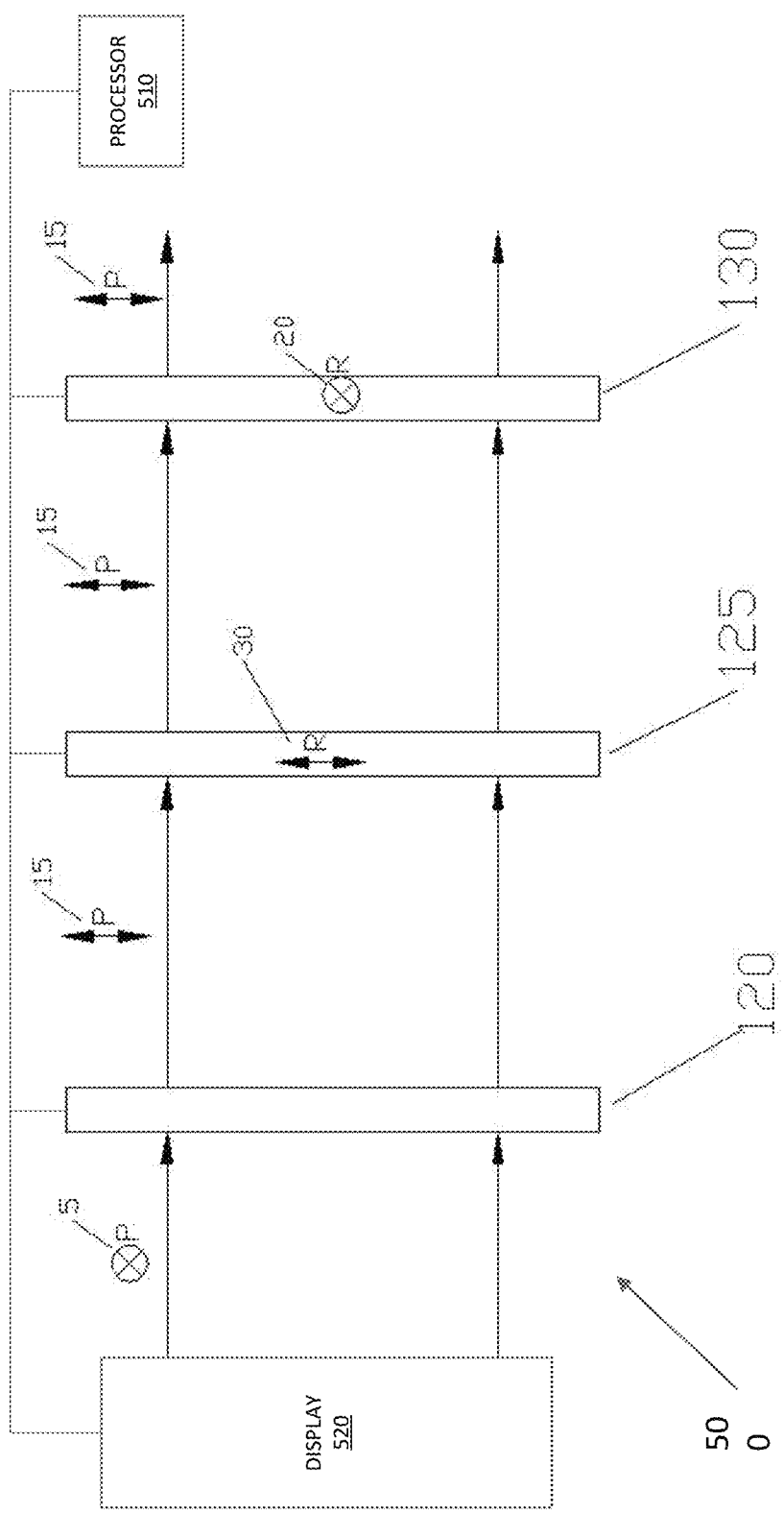
FIG. 5 shows a fast-switching lens system with a fast polarization changer followed by a pair of slower electroactive lenses, both of which are off (not focusing light).
Figure 6:
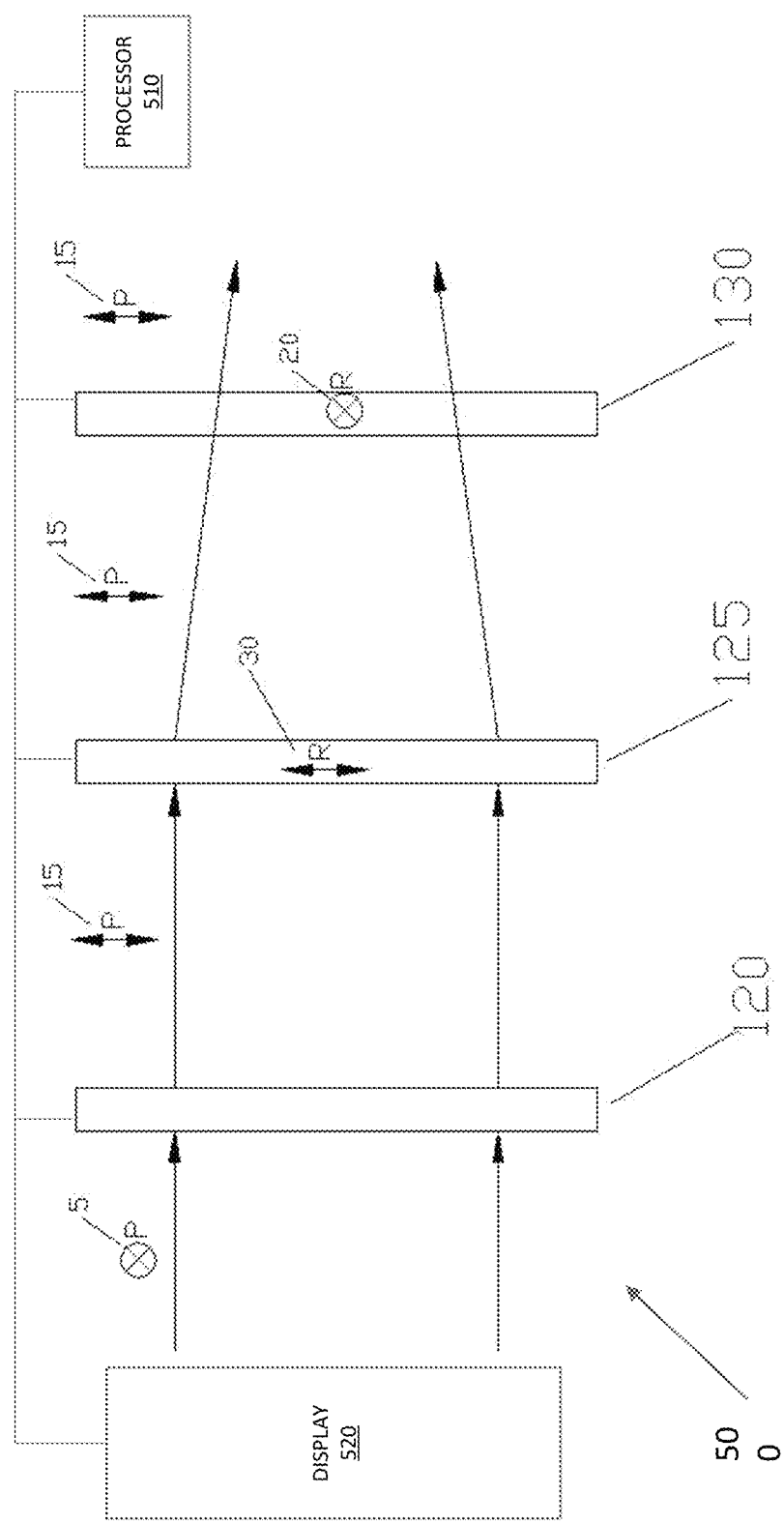
FIG. 6 shows the fast-switching lens system of FIG. 5 with the fast polarization changer off (changing the polarization state) and the first electroactive lens on (focusing light).
Figure 7:
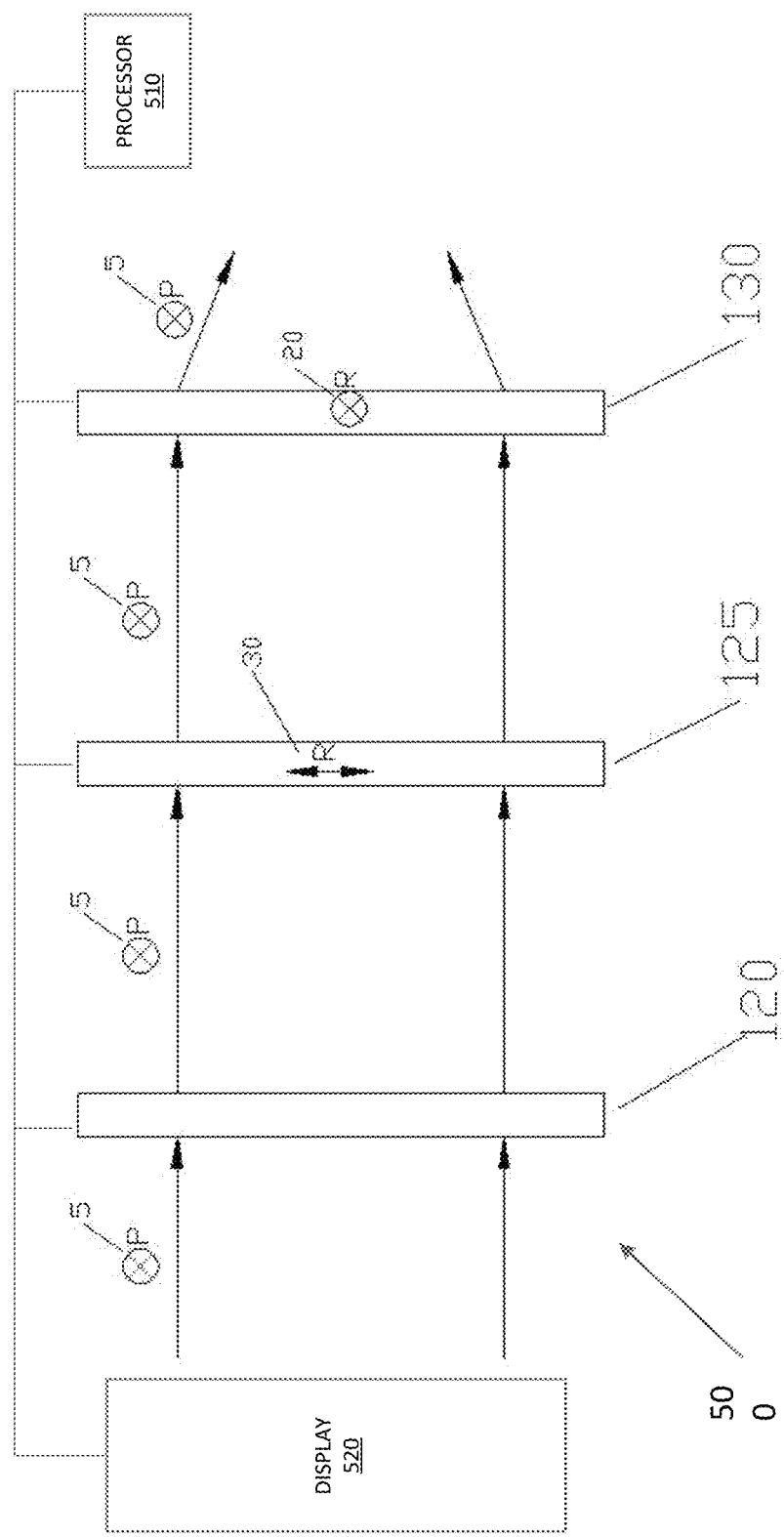
FIG. 7 shows the fast-switching lens system of FIG. 5 with the fast polarization changer on (not changing the polarization state) and the second electroactive lens on (focusing light).

FIGS. 5-7 illustrate operation of a fast-switching electroactive lens system 500 with a polarization adjuster 120, a first electroactive (liquid crystal) lens 125, and a second electroactive (liquid crystal) lens 130 in optical series with each other. The first electroactive lens 125 has alignment layers rubbed in orientation 30 and the second electroactive lens 130 has alignment layers rubbed in orthogonal orientation 20. Although FIGS. 5-7 show gaps between the components, the components can be touching each other and bonded together or otherwise integrated to form a single unit just like the system 350 in FIG. 3B. The fast-switching electroactive lens system 500 focuses and/or transmits polarized light emitted a display 520, such as a transparent organic light-emitting diode (OLED) display in an augmented reality system. The fast-switching electroactive lens system 500 and display 520 are operably coupled to a processor 510, which can control the polarization adjuster 120, first electroactive lens 125, and second electroactive lens 130 in response to the content (video imagery) shown on the display 520.

In FIG. 5, the polarization adjuster 120 is in an off state, as are the electroactive lenses 125 and 130. Light entering polarization adjuster 120 in polarization orientation 5 and exits in orientation 15 (i.e., it is changed from one linear polarization state to an orthogonal linear polarization state). In this example, if polarization adjuster 120 and lens 125 are in the electrically off state and lens 130 is switched to the electrically on state, no optical focusing takes place because the orientation of the rub direction of lens 130 is orthogonal to the polarization state of the light entering the lens 130. Put differently, if the first electroactive lens 125 has no optical power in the off state, and the second electroactive lens 130 does not act upon the light in polarization orientation 15, the system 500 does not focus incident light.

FIG. 6 shows polarization adjuster 120 still in the electrically off state and the first and second electroactive lenses 125 and 130 in the electrically on state. In this configuration, the first electroactive lens 125 has optical power thanks to a voltage that actuates its liquid crystal material, changing its refractive index distribution. Because the polarization of light entering the first electroactive lens 125 matches the orientation of the first electroactive lens's rub direction 30, the first electroactive lens 125 focuses the incident light. The second electroactive lens 130, however, does not focus light, regardless of its setting, because its rub direction 20 is orthogonal to the polarization orientation 15 of the light.

FIG. 7 shows the polarization adjuster 120, first electroactive lens 125, and second electroactive lens 130 in the electrically on state (i.e., with voltages applied to their liquid crystal layers). In this condition, the polarization adjuster 120 does not transform the polarization state of the incident light; instead, the polarization adjuster 120 transmits the incident light in polarization orientation 5. This means that the light emerging from polarization adjuster 120 is no longer polarized in the same orientation of the rub direction 30 of the first electroactive lens 125 but is now polarized in the same orientation of the rub direction 20 of the second electroactive lens 130. As a result, the second electroactive lens 130 focuses the incident light but the first electroactive lens 125 does not. If the second electroactive lens 130 has a higher optical power (shorter focal length) in the on state than the first electroactive lens 125, as shown FIG. 7, this change in the polarization state changes the optical power (focal length) of the lens system 500 even though the states of the first and second electroactive lenses 125 and 130 did not change.

Viewing a Video with a Fast-Switching Electroactive Lens System

Figure 8:
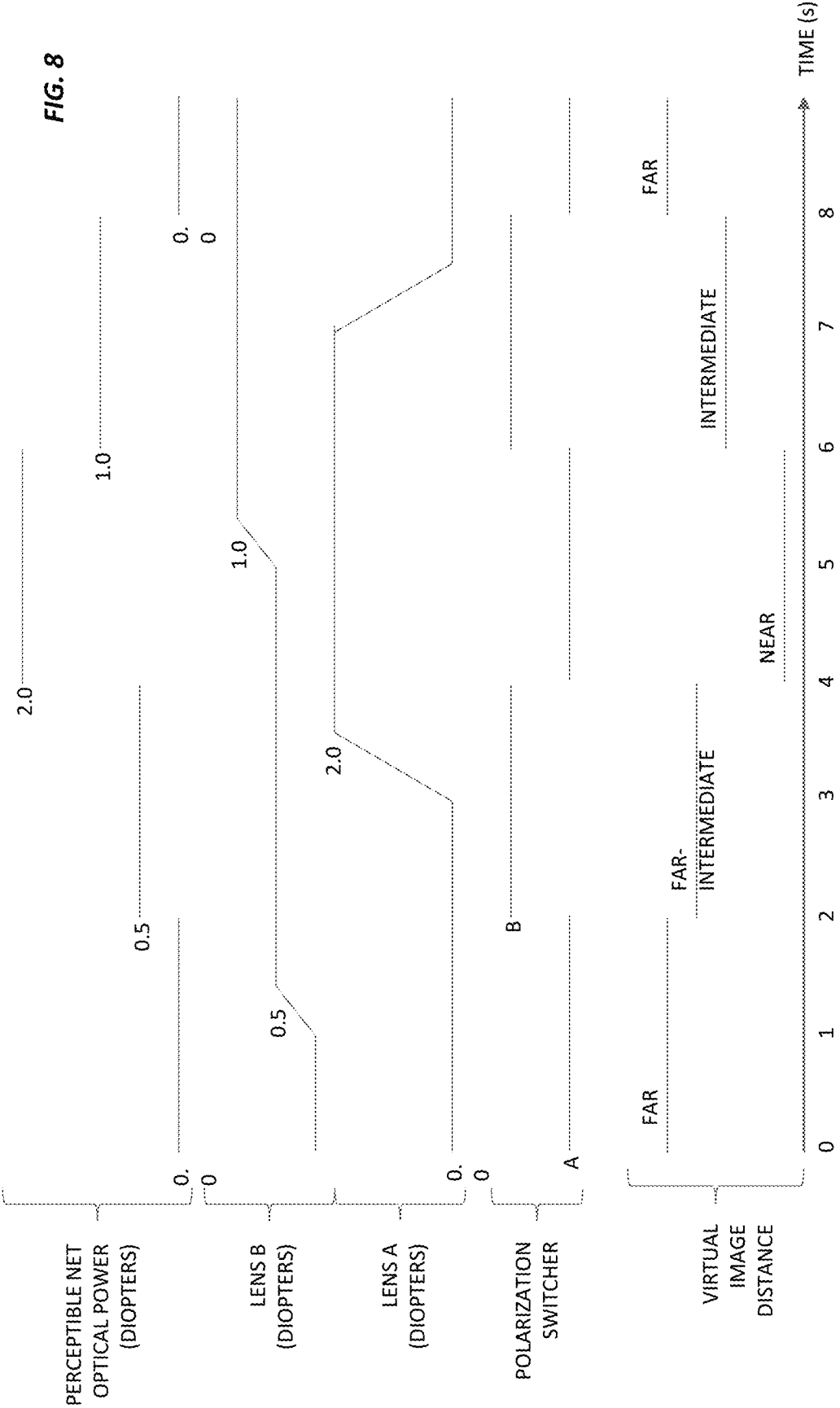
FIG. 8 illustrates a process for actuating a fast-switching lens system with fast polarization changer followed by a pair of slower electroactive lenses in an augmented or virtual reality system.

FIG. 8 illustrates a process by which a fast-switching electroactive lens system like the systems in FIGS. 3 and 5-7 can be used to adjust the focus of virtual images appearing in a video or other dynamic environment presented via an augmented, mixed, or virtual reality system. In the following example, the electroactive lens system includes a polarization-changing component (or polarization changer) that can switch between states A (e.g., π/2 retardance) and B (e.g., 0 retardance) in 35 milliseconds and two focus-changing components (electroactive lenses or focus changers, lenses A and B) that can switch states in about 350 milliseconds each. The electroactive lens system is used in an augmented/virtual reality system that shows a video clip of eight seconds duration. Displaying the video clip involves changing the focus every two seconds, with the focus change occurring in 35 milliseconds as apparent to the viewer.

This example video clip begins with the digital image at far distance. At the two-second mark, the digital image's simulated distance changes from far distance to far-intermediate as shown in the bottom trace in FIG. 8. At the four-second mark, the simulated distance changes from far-intermediate to near. At the six-second mark, the simulated distance changes from near to intermediate. And at the eight-second mark, the simulated distance changes back to far distance from intermediate.

For purposes of this example, the simulated distances for far, far intermediate, intermediate, and near are 6 meters, 2 meters, 1 meter, and 0.5 meters, respectively. To view images at these distances, the electroactive lens system provides net perceptible optical powers, in the same order, of zero diopters, a half diopter, one diopter, and two diopters of optical power, respectively. In this example, lenses A and B are each switchable among at least a subset of these optical powers, with lens A switchable between a zero-diopter state and a two-diopter state and lens B switchable among a zero-diopter state, a half-diopter state, and a one-diopter state.

In this example, when the polarization changer is in state A, lens A is optically present and lens B is not. When polarization changer is in state B, lens A is not optically present and lens B is present. That is, lens A focuses light transmitted by the polarization changer is in state A but not when the polarization changer is in state B, and lens B focuses light transmitted by the polarization changer is in state B but not when the polarization changer is in state A. A lens that is not focusing light, either because the lens is not actuated or because the incident light is the polarization state that isn't focused by the lens, provides an optical power of zero diopters.

At the start of the video, the polarization changer is in state A, lens A is at zero diopters because it is off, and lens B is also at zero diopters because it is off and because the polarization changer is in state A. The net perceptible optical power of the electroactive lens system is zero diopters.

Shortly after the video clip begins, for example, at the one-second mark, a processor coupled to or integrated in the electroactive lens instructs lens B to switch optical power from zero diopters to one-half diopter. While lens B changes focus, the viewer cannot see any optical effects occurring in lens B because the polarization changer has rendered lens B not optically present (the polarization changer is still in state A). Lens B has a full second to complete its change to the new optical power, far more time than required. At the two-second mark in the video clip, the polarization changer switches states from state A to state B, causing lens B to be optically present, causing the net perceptible optical power of the system to change from zero diopters to one-half diopter in 35 milliseconds.

Shortly after the two-second mark has passed, for example, at the three-second mark, the processor instructs lens A to switch optical power from zero to two diopters. While lens A changes focus, the viewer cannot see any optical effects in lens A occurring because the polarization changer has rendered lens A not optically present (the polarization changer is still in state B, so the net perceptible optical power of the electroactive lens system remains at one-half diopter). Lens A has a full second to complete its change to the new optical power, far more time than required. At the four-second mark in the video clip, the polarization changer switches states again, causing lens A to be optically present and lens B not to be optically present, resulting in the net perceptible optical power of the system changing from one-half diopters to two diopters in 35 milliseconds.

Shortly after the four-second mark has passed, for example, at the five-second mark, the processor instructs lens B to switch optical power from one-half diopter to one diopter. While in the transition state of change, the user cannot see any optical effects occurring because the polarization changer has rendered lens B not optically present. Lens B has a full second to complete its change to the new optical power, far more time than required. At the six-second point in the video clip the polarization changer switches states, resulting in the net perceptible optical power of the system changing from two diopters to one diopter in 35 milliseconds.

Shortly after the six-second mark has passed, for example, at the seven-second point, lens A is instructed to switch optical power from one diopter to zero diopters. While lens A changes focus again, the viewer cannot see any optical effects occurring in lens A because the polarization changer has rendered lens A not optically present (the polarization changer is still in state B). Lens A has a full second to complete its change to the new optical power, far more time than required. At the eight-second mark in the video clip, the polarization changer switches states again, causing lens A to be optically present and lens B to be optically absent (not present), resulting in the net perceptible optical power of the system changing from two diopters to zero diopters in 35 milliseconds.

This sequence may be modified and repeated as desired, tied to and coordinated by signals from the controller or processor presenting the digital images.

Although the lenses may take hundreds of milliseconds to change focus, the viewer observes each focus change occurring within 35 millisecond.

The video output can be prepared beforehand and can be programmed/controlled to be coordinated with the electroactive lens components to reduce the viewer's perception of focus-switching time. However, in some cases, video imagery may not be pre-prepared and cannot be used to control the switching in this pre-programmed manner. Instead, the electroactive lens operates in an on-demand switching mode controlled by the viewer with a switch or other command device. In these cases, a similar strategy may be employed where the polarization changer changes state from one state to another state can be delayed until the focus-changing time period has completed, resulting in the user seeing a 35-millisecond optical switching period and a 350-millisecond lag between the switching command and the execution, which may be more desirable than having the user experience a 350 millisecond change-of-focus duration.

In another embodiment, a single electroactive lens may be used with a polarization rotator. Using two tunable lenses allows an almost infinite combination of fast switching configurations from one optical power to another, for example, from one diopter to two diopters to one-half diopter to one diopter and to one-half diopter, etc., while using a single lens allows for fast switching between zero and another optical power, then back to zero diopters, then to another optical power, then zero diopters, etc.

Although the system functions when randomly polarized light enters the system, for example, non-polarized emission from a non-polarized OLED display, it works best with polarized light. Non-polarized or randomly polarized light can be polarized with a polarizer filter located at the light entry point of the system, or by using display technology that emits polarized light, such as LED displays or polarized OLED displays.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electroactive lens system comprising:
a polarization switcher switchable between a first state in which the polarization switcher switches a polarization of light between a first polarization state and a second polarization state and a second state in which the polarization switcher transmits light in the first polarization state;

a first electroactive lens in optical communication with the polarization switcher and switchable between a first focusing state in which the first electroactive lens focuses light in the first polarization state and transmits light in the second polarization state without focusing light in the second polarization state and a first non-focusing state in which the first electroactive lens transmits light in the first polarization state and the second polarization state without focusing light in the first polarization state or the second polarization state; and a second electroactive lens in optical communication with the polarization switcher and the first electroactive lens and switchable between a second focusing state in which the second electroactive lens transmits light in the first polarization state without focusing light in the first polarization state and focuses light in the second polarization state and a second non-focusing state in which the second electroactive lens transmits light in the first polarization state and the second polarization state without focusing light in the first polarization state or the second polarization state.

2. The electroactive lens system of claim 1, wherein the polarization switcher comprises a liquid crystal wave plate.

3. The electroactive lens system of claim 1, wherein the polarization switcher has a retardance of π/2 in the first state and a retardance of 0 in the second state.

4. The electroactive lens system of claim 1, wherein the polarization switcher is configured to switch between the first state and the second state (i) faster than the first electroactive lens is configured to switch between the first focusing state and the first non-focusing state and (ii) faster than the second electroactive lens is configured to switch between the second focusing state and the second non-focusing state.

5. The electroactive lens system of claim 4, wherein the polarization switcher is configured to switch between the first state and the second state within 100 milliseconds.

6. The electroactive lens system of claim 5, wherein the first electroactive lens is configured to switch between the first focusing state and the first non-focusing state in more than 100 milliseconds and the second electroactive lens is configured to switch between the second focusing state and the second non-focusing state in more than 100 milliseconds.

7. The electroactive lens system of claim 5, wherein the polarization switcher is configured to switch between the first state and the second state within 30 milliseconds.

8. The electroactive lens system of claim 1, wherein the polarization switcher and the first electroactive lens share a first common substrate, and the first electroactive lens and the second electroactive lens share a second common substrate.

9. The electroactive lens system of claim 1, wherein the first polarization state is a first linear polarization state and the second polarization state is a second linear polarization state orthogonal to the first linear polarization state.

10. A method of focusing light with an electroactive lens system comprising:

a polarization switcher switchable between a first state in which the polarization switcher switches a polarization of light between a first polarization state and a second polarization state and a second state in which the polarization switcher transmits light in the first polarization state;

a first electroactive lens in optical communication with the polarization switcher and switchable between a first focusing state in which the first electroactive lens focuses light in the first polarization state and transmits light in the second polarization state without focusing the light in the second polarization state and a first non-focusing state in which the first electroactive lens transmits light in the first polarization state and the second polarization state without focusing the light in the first polarization state or the second polarization state; and a second electroactive lens in optical communication with the polarization switcher and the first electroactive lens and switchable between a second focusing state in which the second electroactive lens transmits light in the first polarization state without focusing the light in the first polarization state and focuses light in the second polarization state and a second non-focusing state in which the second electroactive lens transmits light in the first polarization state and the second polarization state without focusing the light in the first polarization state or the second polarization state, the method comprising:

setting the polarization switcher to one of the first state or the second state;

setting the first electroactive lens to one of the first focusing state or the first non-focusing state;

setting the second electroactive lens to one of the second focusing state or the second non-focusing state; and sending the light through the polarization switcher, the first electroactive lens, and the second electroactive lens.

11. The method of claim 10, wherein the polarization switcher is in the first state, the first electroactive lens is in the first focusing state, and the second electroactive lens is in the second non-focusing state, and further comprising:

switching the second electroactive lens from the second non-focusing state to the second focusing state while transmitting light in the first polarization state through the polarization switcher, focusing the light with the first electroactive lens, and transmitting the light through the second electroactive lens without focusing the light by the second electroactive lens; and switching the polarization switcher from the first state to the second state after the second electroactive lens has switched from the second non-focusing state to the second focusing state, thereby causing the second electroactive lens to focus the light and causing the first electroactive lens to transmit the light without focusing the light.

12. The method of claim 11, wherein switching the second electroactive lens from the second non-focusing state to the second focusing state and switching the polarization switcher from the first state to the second state occur in response to a desired change in a position of a virtual image.

13. The method of claim 11, wherein switching the second electroactive lens from the second non-focusing state to the second focusing state takes at least 100 milliseconds and switching the polarization switcher from the first state to the second state takes less than 100 milliseconds.

14. The method of claim 10, wherein the first polarization state is a first linear polarization state and the second polarization state is a second linear polarization state orthogonal to the first linear polarization state.

15. An electroactive lens system comprising:

a liquid-crystal wave plate switchable between a 0-wave retardance and a half-wave retardance within 35 milliseconds;

a first liquid-crystal lens in optical communication with the liquid-crystal wave plate and switchable between a first state in which the first liquid-crystal lens focuses light in a first linear polarization state to a first focal plane without focusing light in a second linear polarization state orthogonal to the first linear polarization state and a second state in which the first liquid-crystal lens focuses light in the first linear polarization state to a second focal plane without focusing light in the second linear polarization state; and a second liquid-crystal lens in optical communication with the liquid-crystal wave plate and the first liquid-crystal lens and switchable between a first state in which the second liquid-crystal lens focuses light in the second linear polarization state to a third focal plane without focusing light in the first linear polarization state and a second state in which the second liquid-crystal lens focuses light in the second linear polarization state to a fourth focal plane without focusing light in the first linear polarization state.

16. The electroactive lens system of claim 15, wherein the liquid-crystal wave plate and the first liquid-crystal lens share a first common substrate, and the first liquid-crystal lens and the second liquid-crystal lens share a second common substrate.

17. The electroactive lens system of claim 15, wherein the first liquid-crystal lens is configured to switch between the first state and the second state in more than 35 milliseconds.

18. The electroactive lens system of claim 15, further comprising:

a display in optical communication with the liquid-crystal wave plate and configured to emit light in the first linear polarization state.

19. The electroactive lens system of claim 18, further comprising:

a processor operably coupled to the liquid-crystal wave plate, the first liquid-crystal lens, the second liquid-crystal lens, and the display and configured to control the liquid-crystal wave plate, the first liquid-crystal lens, the second liquid-crystal lens, and the display.

\* \* \* \* \*